Patented Dec. 18, 1923.

1,478,088

UNITED STATES PATENT OFFICE.

HERBERT A. WINKELMANN AND HAROLD GRAY, OF AKRON, OHIO, ASSIGNORS TO THE B. F. GOODRICH COMPANY, OF NEW YORK, N. Y., A CORPORATION OF NEW YORK.

METHOD OF VULCANIZING RUBBER.

No Drawing. Application filed September 9, 1921, Serial No. 499,886. Renewed November 2, 1923.

*To all whom it may concern:*

Be it known that we, HERBERT A. WINKELMANN and HAROLD GRAY, citizens of the United States, residing at Akron, in the county of Summit and State of Ohio, have invented a certain new and useful Method of Vulcanizing Rubber, of which the following is a specification.

This invention relates to the art of compounding and vulcanizing rubber compositions with accelerators. Its main object is to provide an accelerator which will be effective as such and also improve the physical and chemical characteristics of the vulcanized product such as its tensile strength, life, and elongation, and which will be free from toxic or objectionable properties either to the workers or to users of the vulcanized product.

This method comprises the use, as an accelerator, of the potassium salt of glycerophosphoric acid, commonly called potassium glycerophosphate. This material may be purchased on the market as a colorless syrup consisting of a 75% solution of the salt in water. It can readily be incorporated in the rubber compound either directly or by first being mixed with rubber alone or with rubber and other ingredients into a master batch. It is effective as an accelerator in pure gum and other stocks, and being non-poisonous it is highly advantageous in products such as dental dam on that account, as well as in other rubber compounds. In addition to a rapid cure, this accelerator produces high tensile strengths and elongations.

By way of example, in a mixture consisting of 100 parts by weight of rubber, 3 of zinc oxide, 5 of sulphur, and 4.5 of a 75% solution of potassium glycerophosphate, vulcanized at 285° F., the following results were obtained:

| Time of cure. | Tensile strength. | Elongation. |
|---|---|---|
| *Min.* | *Lbs.* | *Per cent.* |
| 15 | 3316 | 940 |
| 30 | 3425 | 910 |
| 60 | 3682 | 920 |
| 90 | 2859 | 920 |
| 120 | 2590 | 850 |

Variations of the above compound with a view to obtaining different characteristics of the vulcanized product will, of course, be obvious to rubber chemists.

We claim:

1. The herein-described method which comprises vulcanizing rubber with an admixture of a vulcanizing agent and potassium glycerophosphate.

2. The method of producing a vulcanized rubber product which comprises mixing potassium glycerophosphate with rubber and sulphur, and vulcanizing the mixture.

3. A vulcanized composition containing before vulcanization rubber, a vulcanizing agent and potassium glycerophosphate.

4. Vulcanized rubber comprising products of the action of sulfur and potassium glycerophosphate.

In witness whereof we have hereunto set our hands this 7th of September 1921.

HERBERT A. WINKELMANN.
HAROLD GRAY.